United States Patent
Tang et al.

(10) Patent No.: US 11,330,602 B2
(45) Date of Patent: May 10, 2022

(54) WIRELESS COMMUNICATION METHOD, NETWORK DEVICE, AND TERMINAL DEVICE

(71) Applicant: Huawei Technologies Co., Ltd., Shenzhen (CN)

(72) Inventors: Xun Tang, Beijing (CN); Wei Quan, Beijing (CN); Jian Zhang, Beijing (CN); Li Chai, Shenzhen (CN); Jinhua Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/674,280

(22) Filed: Nov. 5, 2019

(65) Prior Publication Data

US 2020/0077415 A1 Mar. 5, 2020

Related U.S. Application Data

(63) Continuation of application No. PCT/CN2017/083308, filed on May 5, 2017.

(51) Int. Cl.
*H04W 72/08* (2009.01)
*H04W 64/00* (2009.01)
(Continued)

(52) U.S. Cl.
CPC ....... *H04W 72/085* (2013.01); *H04W 64/006* (2013.01); *H04W 72/042* (2013.01);
(Continued)

(58) Field of Classification Search
CPC ............ H04W 72/085; H04W 64/006; H04W 72/0413; H04W 72/042; H04W 72/048; G05D 1/0022; G05D 1/101

See application file for complete search history.

(56) References Cited

U.S. PATENT DOCUMENTS 9,294,970 B1 * 3/2016 Sitaram ............. H04W 36/0083
9,537,561 B1   1/2017 Kotecha et al.
(Continued)

FOREIGN PATENT DOCUMENTS

CN   102435194 A   5/2012
CN   105448137 A   3/2016
(Continued)

OTHER PUBLICATIONS

"Field measurement results for drone LIE enhancement," 3GPP TSG-RAN WG1 Meeting 88bis, Spokane, USA, R1-1705823, total 6 pages, 3rd Generation Partnership Project, Valbonne, France (Apr. 3-7, 2017).

(Continued)

*Primary Examiner* — Dinh Nguyen

(74) *Attorney, Agent, or Firm* — Leydig, Voit & Mayer, Ltd.

(57) ABSTRACT

A wireless communication method, a terminal device, and a network device are provided. The terminal device receives a first indication message sent by the network device, so that the terminal device may select, according to the first indication message, to fly in an appropriate cell. This ensures communication between the terminal device and the network device. The method includes: receiving, by the terminal device, the first indication message sent by the network device. The first indication message includes at least one of: flight zone restriction information of at least one cell, flight altitude information of the at least one cell, flight speed information of the at least one cell, volume information of a flight device, and weight information of the flight device, and/or the first indication message includes information about a flight transmission characteristic supported by the at least one cell.

24 Claims, 6 Drawing Sheets

(51) Int. Cl.
*H04W 72/04* (2009.01)
*G05D 1/00* (2006.01)
*G05D 1/10* (2006.01)

(52) U.S. Cl.
CPC ..... *H04W 72/048* (2013.01); *H04W 72/0413* (2013.01); *G05D 1/0022* (2013.01); *G05D 1/101* (2013.01)

(56) References Cited

U.S. PATENT DOCUMENTS

| | | | |
|---|---|---|---|
| 2013/0253738 A1* | 9/2013 | Fucke | G01C 23/00 701/14 |
| 2014/0032013 A1* | 1/2014 | Riley | G01C 23/00 701/2 |
| 2014/0166817 A1 | 6/2014 | Levien et al. | |
| 2015/0147976 A1 | 5/2015 | Wang et al. | |
| 2015/0336669 A1* | 11/2015 | Kantor | G08G 5/0013 701/3 |
| 2016/0070264 A1* | 3/2016 | Hu | G05D 1/042 701/2 |
| 2016/0225264 A1 | 8/2016 | Taveira | |
| 2016/0246297 A1* | 8/2016 | Song | H04B 7/18506 |
| 2016/0284221 A1 | 9/2016 | Hinkle et al. | |
| 2016/0300492 A1 | 10/2016 | Pasko et al. | |
| 2016/0371987 A1 | 12/2016 | Kotecha | |
| 2017/0025021 A1 | 1/2017 | Song et al. | |
| 2017/0124884 A1 | 5/2017 | Shaw et al. | |
| 2017/0150382 A1* | 5/2017 | Martin | H04W 72/0413 |
| 2017/0285633 A1* | 10/2017 | Poornachandran | G08G 5/0069 |
| 2017/0358221 A1* | 12/2017 | Priest | H04B 7/18502 |

FOREIGN PATENT DOCUMENTS

| | | |
|---|---|---|
| CN | 105515637 A | 4/2016 |
| CN | 105607645 A | 5/2016 |
| CN | 106373434 A | 2/2017 |
| CN | 106604356 A | 4/2017 |
| RU | 2516321 C2 | 5/2014 |
| RU | 2597241 C2 | 9/2016 |
| WO | 2017037845 A1 | 3/2017 |
| WO | 2017063485 A1 | 4/2017 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, pp. 1-330, 3rd Generation Partnership Project, Valbonne, France (Mar. 2017).

* cited by examiner

WIRELESS COMMUNICATION METHOD, NETWORK DEVICE, AND TERMINAL DEVICE

CROSS-REFERENCE TO RELATED APPLICATIONS

This application is a continuation of International Application No. PCT/CN2017/083308, filed on May 5, 2017, the disclosure of which is hereby incorporated by reference in its entirety.

TECHNICAL FIELD

This application relates to the communications field, and more specifically, to a wireless communication method, a network device, and a terminal device.

BACKGROUND

With development of drone technologies, prices of drones decrease continuously, and the drones are used more widely.

A drone communicates with a base station. Performance of the communication between the drone and the base station is vital to the drone.

Therefore, how to achieve desirable communication performance between the drone and a network device (for example, the base station) is an issue to be resolved urgently.

SUMMARY

Embodiments of this application provide a wireless communication method, a network device, and a terminal device, to implement desirable communication performance between a drone and the network device.

According to a first aspect, an embodiment of this application provides a wireless communication method, including:

receiving, by a terminal device, a first indication message sent by a network device, where the first indication message includes at least one of: flight zone restriction information of at least one cell, flight altitude information of the at least one cell, flight speed information of the at least one cell, volume information of a flight device, and weight information of the flight device, and/or the first indication message includes information about a flight transmission characteristic supported by the at least one cell.

Optionally, the at least one cell may belong to at least one network device that includes the network device.

Optionally, the terminal device may be a device in a drone, for example, a communications device or a control device in the drone, or a device separated from the drone, for example, a maneuvering device for the drone.

Optionally, the first indication message may be sent to the terminal device by using a broadcast message or a dedicated message.

Therefore, in the wireless communication method in this embodiment of this application, if the terminal device receives the first indication message sent by the network device by using the broadcast message, the network device may control the terminal device, thereby ensuring communication between the network device and the terminal device.

For example, a flight altitude of the terminal device may be controlled. For another example, a signal to interference plus noise ratio (SINK) of the terminal device may be reduced.

For still another example, the terminal device may choose, based on content included in the first indication message, to access an appropriate cell; and further may receive downlink data transmitted by the network device, and may report information, such as a location and a flight route, of the terminal device.

Further, if the terminal device receives the first indication message sent by the network device by using the dedicated message, the terminal device may adjust, based on a requirement of the first indication message, flight indicators such as an altitude and a speed, to comply with a flight restriction.

Optionally, in an implementation of the first aspect, the method further includes:

reporting, by the terminal device, flight route information to the network device, where the flight route information includes at least one of: a three-dimensional flight speed of the terminal device, a three-dimensional flight direction of the terminal device, and information about an intermediate node location.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

For example, the start location of the terminal device is A, and the end location of the terminal device is B. In this case, the intermediate node location may be a location that is on the flight route of the terminal device and that is a first distance (for example, 10 m or 20 m) away from the start location A.

Optionally, when reaching the intermediate node location, the terminal device determines a next intermediate node location.

Optionally, in an implementation of the first aspect, after the reporting, by the terminal device, flight route information, the method further includes:

receiving, by the terminal device by using at least one resource, data transmitted by the network device, where data transmitted on all of the at least one resource is the same.

Therefore, in the wireless communication method in this embodiment of this application, after accessing the network device, the terminal device reports the flight route information to the network device, so that the network device determines, based on the flight route information, a resource for communicating with the terminal device, thereby ensuring reliability of downlink data transmission.

Optionally, in an implementation of the first aspect, the receiving, by the terminal device by using at least one resource, data transmitted by the network device includes:

receiving, by the terminal device, a second indication message sent by the network device, where the second indication message includes configuration information of a first resource for transmitting the data; and receiving, by the terminal device on the first resource and another preconfigured resource according to the second indication message, the data transmitted by the network device.

Optionally, in an implementation of the first aspect, the receiving, by the terminal device by using at least one resource, data transmitted by the network device includes:

receiving, by the terminal device, a third indication message sent by the network device, where the third indication message includes resource configuration information of the at least one resource for transmitting the data; and receiving, by the terminal device on the at least one resource according to the third indication message, the data transmitted by the network device.

Optionally, in an implementation of the first aspect, the reporting, by the terminal device, flight route information to the network device includes:

receiving, by the terminal device, a configuration message from the network device, where the configuration message is used to instruct the terminal device to report the flight route information; and reporting, by the terminal device, the flight route information based on the configuration message.

Optionally, in an implementation of the first aspect, the reporting, by the terminal device, flight route information to the network device includes:

adding, by the terminal device, the flight route information to a measurement report.

Optionally, in an implementation of the first aspect, the method further includes:

reporting, by the terminal device, flight capability information or terminal device category information to the network device, where the flight capability information or the user equipment (UE) category information is used to indicate that the terminal device has a flight capability, and/or notify the network device that the terminal device is capable of reporting the flight route information, and the flight route information includes at least one of: the three-dimensional flight speed of the terminal device, the three-dimensional flight direction of the terminal device, and the information about the intermediate node location.

Therefore, in the wireless communication method in this embodiment of this application, the terminal device reports the flight capability information or the UE category information to the network device, so that the network device learns that the terminal device has the flight capability, and can further learn that the terminal device is capable of reporting the flight route information. In this way, communication between the network device and the terminal device can be ensured.

Optionally, in an implementation of the first aspect, the method further includes:

reporting, by the terminal device, location information to the network device; and receiving, by the terminal device, a fourth indication message sent by the network device when a flight altitude of the terminal device is greater than a first threshold, where the fourth indication message is used to indicate that flight of the terminal device violates a regulation, and/or that the flight altitude needs to be reduced or the flight needs to be stopped.

Therefore, in the wireless communication method in this embodiment of this application, the terminal device reports the location information, so that the network device obtains the location information of the terminal device during the flight in a timely manner, and sends the indication message in a timely manner when the flight altitude of the terminal device is greater than the first threshold, thereby ensuring that the terminal device flies in an appropriate zone.

Optionally, in an implementation of the first aspect, the method further includes:

when the terminal device meets a flight restriction of a first cell, and/or has a flight transmission characteristic supported by the first cell, preferentially accessing, by the terminal device, the first cell, where the first cell belongs to the at least one cell.

For example, the terminal device accesses, according to the first indication message, a cell belonging to the network device.

Therefore, in the wireless communication method in this embodiment of this application, the terminal device may preferentially access a cell that meets a restriction. In this way, the communication between the network device and the terminal device can be ensured.

According to a second aspect, an embodiment of this application provides a wireless communication method, including:

determining, by a network device, a first indication message, where the first indication message includes at least one of: flight zone restriction information of at least one cell, flight altitude information of the at least one cell, flight speed information of the at least one cell, volume information of a flight device, and weight information of the flight device, and/or information about a flight transmission characteristic supported by the at least one cell; and sending, by the network device, the first indication message to a terminal device.

Optionally, the at least one cell may belong to at least one network device that includes the network device.

Optionally, the terminal device may be a device in a drone, for example, a communications device or a control device in the drone.

Optionally, the first indication message may be sent to the terminal device by using a broadcast message or a dedicated message.

It should be understood that when the network device sends the first indication message to the terminal device by using the dedicated message, the terminal device has accessed the network device.

Therefore, in the wireless communication method in this embodiment of this application, if the terminal device receives the first indication message sent by the network device by using the broadcast message, the network device may control the terminal device, thereby ensuring communication between the network device and the terminal device.

For example, a flight altitude of the terminal device may be controlled. For another example, a signal to interference plus noise ratio of the terminal device may be reduced.

For still another example, the terminal device may choose, based on content included in the first indication message, to access an appropriate cell; and further may receive downlink data transmitted by the network device, and may report information, such as a location and a flight route, of the terminal device.

Further, if the terminal device receives the first indication message sent by the network device by using the dedicated message, the terminal device may adjust, based on a requirement of the first indication message, flight indicators such as an altitude and a speed, to comply with a flight restriction.

Optionally, in an implementation of the second aspect, the method further includes:

receiving, by the network device, flight route information reported by the terminal device, where the flight route information includes at least one of: a three-dimensional flight speed of the terminal device, a three-dimensional flight direction of the terminal device, and information about an intermediate node location; and determining, by the network device based on the flight route information, at least one resource for communicating with the terminal device.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

For example, the start location of the terminal device is A, and the end location of the terminal device is B. In this case, the intermediate node location may be a location that is on a flight route of the terminal device and that is a first distance (for example, 10 m or 20 m) away from the start location A.

Optionally, when reaching the intermediate node location, the terminal device determines a next intermediate node location.

Therefore, in the wireless communication method in this embodiment of this application, after the terminal device accesses the network device, the network device receives the flight route information reported by the terminal device, so that a resource for communicating with the terminal device can be determined based on the flight route information, thereby ensuring reliability of downlink data transmission.

Optionally, in an implementation of the second aspect, after the determining at least one resource for communicating with the terminal device, the method further includes:

transmitting, by the network device by using the at least one resource, data to the terminal device, where data transmitted on all of the at least one resource is the same.

Optionally, in an implementation of the second aspect, before the transmitting, by the network device by using the at least one resource, data to the terminal device, the method further includes:

sending, by the network device, a second indication message to the terminal device, where the second indication message includes configuration information of a first resource for transmitting the data, so that the terminal device receives, on the first resource and another preconfigured resource, the data transmitted by the network device; or sending, by the network device, a third indication message to the terminal device, where the third indication message includes resource configuration information of the at least one resource for transmitting the data, so that the terminal device receives, on the at least one resource, the data transmitted by the network device.

Optionally, in an implementation of the second aspect, before the receiving, by the network device, flight route information reported by the terminal device, the method further includes:

sending, by the network device, a configuration message to the terminal device, where the configuration message is used to instruct the terminal device to report the flight route information.

Optionally, in an implementation of the second aspect, the receiving, by the network device, flight route information reported by the terminal device includes:

receiving, by the network device, a measurement report of the terminal device, where the measurement report carries the flight route information.

Optionally, in an implementation of the second aspect, the method further includes:

receiving, by the network device, a flight capability information or terminal device category information from the terminal device, where the flight capability information or the terminal device category information is used to indicate that the terminal device has a flight capability, and/or notify the network device that the terminal device is capable of reporting the flight route information.

Therefore, in the wireless communication method in this embodiment of this application, the network device receives the flight capability information or the terminal device category information reported by the terminal device, so that the network device can learn that the terminal device has the flight capability, and may learn that the terminal device is capable of reporting the flight route information. In this way, the network device can accurately communicate with the terminal device.

Optionally, in an implementation of the second aspect, the method further includes:

receiving, by the network device, location information reported by the terminal device; and sending, by the network device, a fourth indication message to the terminal device when a flight altitude of the terminal device is greater than a first threshold, where the fourth indication message is used to indicate that flight of the terminal device violates a regulation, and/or that the flight altitude needs to be reduced or the flight needs to be stopped.

Therefore, in the wireless communication method in this embodiment of this application, the network device receives the location information reported by the terminal device, so that the network device can obtain the location information of the terminal device during the flight in a timely manner, and send the indication message in a timely manner when the flight altitude of the terminal device is greater than the first threshold, thereby ensuring that the terminal device flies in an appropriate zone.

According to a third aspect, an embodiment of this application provides a wireless communication method, including:

reporting, by a terminal device, flight route information to the network device, where the flight route information includes at least one of: a three-dimensional flight speed of the terminal device, a three-dimensional flight direction of the terminal device, and information about an intermediate node location, so that the network device determines, based on the flight route information, at least one resource for communicating with the terminal device.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

Therefore, in the wireless communication method in this embodiment of this application, after the terminal device accesses the network device, the network device receives the flight route information reported by the terminal device, so that a resource for communicating with the terminal device can be determined based on the flight route information, thereby ensuring reliability of downlink data transmission.

Optionally, in an implementation of the third aspect, after the reporting, by the terminal device, flight route information, the method further includes:

receiving, by the terminal device by using at least one resource, data transmitted by the network device, where data transmitted on all of the at least one resource is the same.

Optionally, in an implementation of the third aspect, the receiving, by the terminal device by using at least one resource, data transmitted by the network device includes:

receiving, by the terminal device, a first indication message sent by the network device, where the first indication message includes configuration information of a first resource for transmitting the data; and receiving, by the terminal device on the first resource and another preconfigured resource according to the first indication message, the data transmitted by the network device.

Optionally, in an implementation of the third aspect, the receiving, by the terminal device by using at least one resource, data transmitted by the network device includes:

receiving, by the terminal device, a second indication message sent by the network device, where the second indication message includes resource configuration information of the at least one resource for transmitting the data; and receiving, by the terminal device on the at least one resource according to the second indication message, the data transmitted by the network device.

Optionally, in an implementation of the third aspect, the reporting, by the terminal device, flight route information to the network device includes:

receiving, by the terminal device, a configuration message from the network device, where the configuration message is used to instruct the terminal device to report the flight route information; and reporting, by the terminal device, the flight route information based on the configuration message.

Optionally, in an implementation of the third aspect, the reporting, by the terminal device, flight route information to the network device includes:

adding, by the terminal device, the flight route information to a measurement report.

Optionally, in an implementation of the third aspect, the method further includes:

reporting, by the terminal device, flight capability information or UE category information to the network device, where the flight capability information or the UE category information is used to indicate that the terminal device has a flight capability, and/or notify the network device that the terminal device is capable of reporting the flight route information, and the flight route information includes at least one of: the three-dimensional flight speed of the terminal device, the three-dimensional flight direction of the terminal device, and the information about the intermediate node location.

Optionally, in an implementation of the third aspect, the method further includes:

reporting, by the terminal device, location information to the network device; and receiving, by the terminal device, a third indication message sent by the network device when a flight altitude of the terminal device is greater than a first threshold, where the third indication message is used to indicate that flight of the terminal device violates a regulation, and/or that the flight altitude needs to be reduced or the flight needs to be stopped.

Therefore, in the wireless communication method in this embodiment of this application, the network device receives the location information reported by the terminal device, so that the network device can obtain the location information of the terminal device during the flight in a timely manner, and send the indication message in a timely manner when the flight altitude of the terminal device is greater than the first threshold, thereby ensuring that the terminal device flies in an appropriate zone.

According to a fourth aspect, an embodiment of this application provides a wireless communication method, including:

receiving, by a network device, flight route information reported by a terminal device, where the flight route information includes at least one of: a three-dimensional flight speed of the terminal device, a three-dimensional flight direction of the terminal device, and information about an intermediate node location; and determining, by the network device based on the flight route information, at least one resource for communicating with the terminal device.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

Therefore, in the wireless communication method in this embodiment of this application, the network device receives the flight route information reported by the terminal device, so that a resource for communicating with the terminal device can be determined based on the flight route information, thereby ensuring reliability of downlink data transmission.

Optionally, in an implementation of the fourth aspect, after the determining at least one resource for communicating with the terminal device, the method further includes:

transmitting, by the network device by using the at least one resource, data to the terminal device, where data transmitted on all of the at least one resource is the same.

Optionally, in an implementation of the fourth aspect, before the transmitting, by the network device by using the at least one resource, data to the terminal device, the method further includes:

sending, by the network device, a first indication message to the terminal device, where the first indication message includes configuration information of a first resource for transmitting the data, so that the terminal device receives, on the first resource and another preconfigured resource, the data transmitted by the network device; or sending, by the network device, a second indication message to the terminal device, where the second indication message includes resource configuration information of the at least one resource for transmitting the data, so that the terminal device receives, on the at least one resource, the data transmitted by the network device.

Optionally, in an implementation of the fourth aspect, before the receiving, by the network device, flight route information reported by the terminal device, the method further includes:

sending, by the network device, a configuration message to the terminal device, where the configuration message is used to instruct the terminal device to report the flight route information.

Optionally, in an implementation of the fourth aspect, the receiving, by the network device, flight route information reported by the terminal device includes:

receiving, by the network device, a measurement report of the terminal device, where the measurement report carries the flight route information.

Optionally, in an implementation of the fourth aspect, the method further includes:

receiving, by the network device, a flight capability information or UE category information from the terminal device, where the flight capability information or the UE category information is used to indicate that the terminal device has a flight capability, and/or notify the network device that the terminal device is capable of reporting the flight route information.

Optionally, in an implementation of the fourth aspect, the method further includes:

receiving, by the network device, location information reported by the terminal device; and sending, by the network device, a fourth indication message to the terminal device when a flight altitude of the terminal device is greater than a first threshold, where the fourth indication message is used to indicate that flight of the terminal device violates a regulation, and/or that the flight altitude needs to be reduced or the flight needs to be stopped.

Therefore, in the wireless communication method in this embodiment of this application, the network device receives the location information reported by the terminal device, so that the network device can obtain the location information of the terminal device during the flight in a timely manner, and send the indication message in a timely manner when the flight altitude of the terminal device is greater than the first threshold, thereby ensuring that the terminal device flies in an appropriate zone.

According to a fifth aspect, an embodiment of this application provides a terminal device. The terminal device may include a module or a unit configured to perform the method in any one of the first aspect or the optional implementations of the first aspect.

According to a sixth aspect, an embodiment of this application provides a network device. The network device may include a module or a unit configured to perform the method in any one of the second aspect or the optional implementations of the second aspect.

According to a seventh aspect, an embodiment of this application provides a terminal device. The terminal device may include a module or a unit configured to perform the method in any one of the third aspect or the optional implementations of the third aspect.

According to an eighth aspect, an embodiment of this application provides a network device. The network device may include a module or a unit configured to perform the method in any one of the fourth aspect or the optional implementations of the fourth aspect.

According to a ninth aspect, a terminal device is provided. The terminal device includes a memory, a transceiver, and a processor. The memory stores program code that may be used to instruct to perform any one of the first aspect or the optional implementations of the first aspect. The transceiver is configured to receive or transmit a specific signal when driven by the processor. When the code is executed, the processor may implement each operation performed by a drone in the method.

According to a tenth aspect, a network device is provided. The network device includes a memory, a transceiver, and a processor. The memory stores program code that may be used to instruct to perform any one of the second aspect or the optional implementations of the second aspect. The transceiver is configured to receive or transmit a specific signal when driven by the processor. When the code is executed, the processor may implement each operation performed by a target access network device in the method.

According to an eleventh aspect, a terminal device is provided. The terminal device includes a memory, a transceiver, and a processor. The memory stores program code that may be used to instruct to perform any one of the third aspect or the optional implementations of the third aspect. The transceiver is configured to receive or transmit a specific signal when driven by the processor. When the code is executed, the processor may implement each operation performed by a drone in the method.

According to a twelfth aspect, a network device is provided. The network device includes a memory, a transceiver, and a processor. The memory stores program code that may be used to instruct to perform any one of the fourth aspect or the optional implementations of the fourth aspect. The transceiver is configured to receive or transmit a specific signal when driven by the processor. When the code is executed, the processor may implement each operation performed by a target access network device in the method.

According to a thirteenth aspect, a computer storage medium is provided. The computer storage medium stores program code, and the program code is used to instruct a computer to execute an instruction for the method in any one of the first aspect or the possible implementations of the first aspect.

According to a fourteenth aspect, a computer storage medium is provided. The computer storage medium stores program code, and the program code is used to instruct a computer to execute an instruction for the method in any one of the second aspect or the possible implementations of the second aspect.

According to a fifteenth aspect, a computer storage medium is provided. The computer storage medium stores program code, and the program code is used to instruct a computer to execute an instruction for the method in any one of the third aspect or the possible implementations of the third aspect.

According to a sixteenth aspect, a computer storage medium is provided. The computer storage medium stores program code, and the program code is used to instruct a computer to execute an instruction for the method in any one of the fourth aspect or the possible implementations of the fourth aspect.

According to a seventeenth aspect, a computer program product including an instruction is provided. When the computer program product is run on a computer, the computer is enabled to perform the methods in the foregoing aspects.

DESCRIPTION OF EMBODIMENTS

The following describes technical solutions of the embodiments of this application with reference to accompanying drawings.

Figure 1:
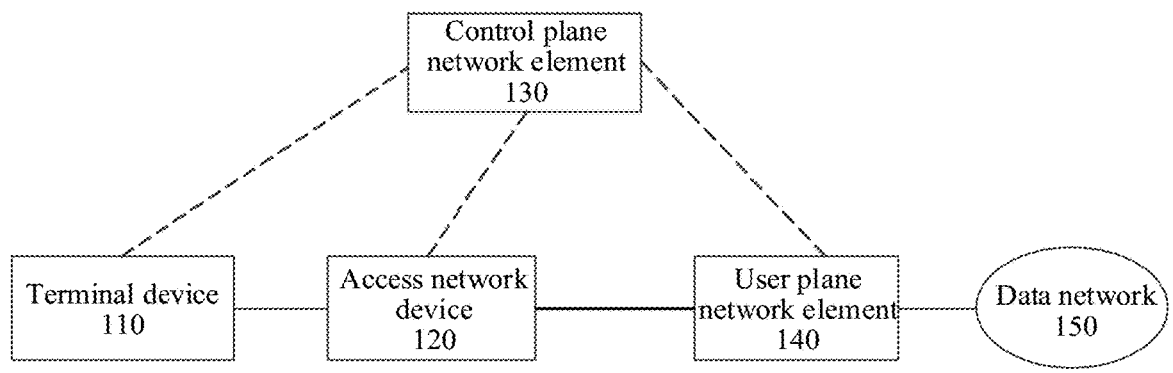
FIG. 1 is a schematic diagram of a communications system that uses a wireless communication method according to an embodiment of this application.

FIG. 1 is a schematic diagram of a communications system 100 that uses a wireless communication method according to this application. As shown in FIG. 1, the communications system 100 includes a terminal device 110, an access network device 120, a control plane network element 130, a user plane network element 140, and a data network 150. In addition, a person of ordinary skill in the art may understand that different devices in the communications system 100 communicate with each other through an interface.

Figure 2:
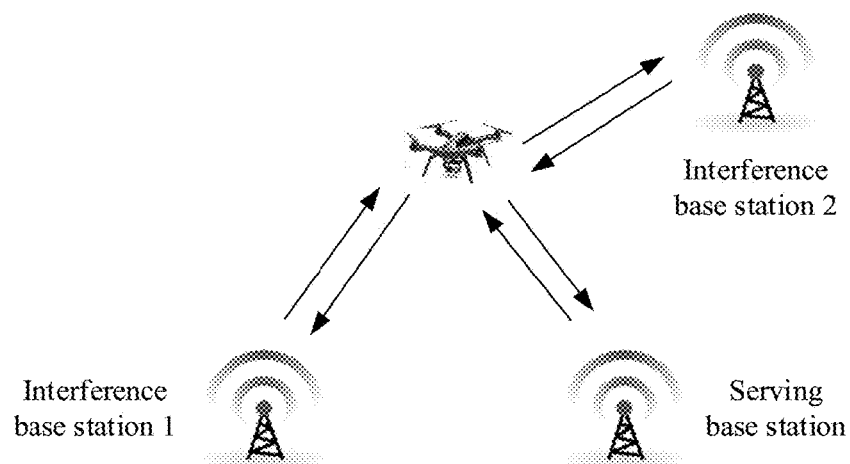
FIG. 2 is a schematic diagram showing that communication between a drone and a serving base station is interfered by a plurality of base stations.
Figure 3:
FIG. 3 is a schematic diagram of flight restrictions of a drone.

The terminal device 110 may establish a user plane connection to the access network device 120 by using a bearer, or may establish a communication signaling connection to the control plane network element 130 through an interface. Optionally, the terminal device 110 may be a drone, or may be another device having a flight capability, for example, a smart robot or a hot air balloon. Optionally, as shown in FIG. 2, after a flight altitude of the terminal device 110 (for example, a drone) exceeds that of the access network device 120 (for example, a base station), the drone can "see" more base stations, in other words, receive signals from a plurality of other base stations, leading to an increase of interference in a downlink direction. Consequently, an SINR of the drone in the downlink direction is worsened obviously, and data cannot be transmitted at a high speed. Optionally, as shown in FIG. 3, flight of the terminal device 110 (for example, the drone) needs to comply with a regulation, and the terminal device cannot fly randomly. After taking off, the drone needs to report a location and an altitude of the drone to the access network device 120 (for example, the base station) at any time for monitoring.

The access network device 120 may be a device that communicates with the terminal device 110, for example, the base station or a base station controller. However, it may be understood that the access network device 120 may communicate with any quantity of terminal devices that are similar to the terminal device 110. The access network device 120 may further communicate with the control plane network element 130 through the interface. Similarly, the access network device 120 may further communicate with the user plane network element 140 through an interface. Each access network device may provide communication coverage for a specific geographical area, and may communicate with a terminal device (for example, a drone) located in the coverage area (a cell). The access network device may support communication protocols of different standards, or may support different communication modes. Optionally, the access network device 120 may provide a wireless access service for the drone. For example, the access network device 120 may be a radio controller in an evolved NodeB (eNodeB), a wireless fidelity access point (Wi-Fi AP), a worldwide interoperability for microwave access base station (WiMAX BS), or a cloud radio access network (CRAN), or may be a network device in a 5G network or a network device in a future evolved public land mobile network (PLMN).

The control plane network element 130 is responsible for mobility management and forwarding path management in the communications system 100, for example, delivering a packet forwarding policy to the user plane network element 140 to instruct a gateway user plane (GW-U) to process and forward a packet according to the packet forwarding policy.

The control plane network element 130 may be a software-defined networking (SDN) controller, a gateway control plane (GW-C), a mobility management entity (MME), or all or some of control functions formed after the foregoing network elements are combined. A software-defined network technology provides an effective solution to a bottleneck problem of gateway signaling processing. A control plane interface signaling processing function of a gateway is further separated from a user plane data forwarding function of the gateway. The interface signaling processing function is set on a general calculation platform to become a control plane (CP) network element, and the user plane data forwarding function is set on a dedicated hardware platform to become a user plane (UP) network element. The control plane network element 130 may further be divided into a mobility management network element and a session management network element. The mobility management network element is responsible for mobility management of the terminal device, for example, an attachment network change of the terminal device or a location change of the terminal device. The session management network element is responsible for session management of the terminal device, for example, establishment, modification, or release of a session. In addition, decoupling of controlling and forwarding of a gateway device greatly simplifies a design of the hardware platform and reduces costs of the hardware platform. This helps accelerate deployment of a mobile packet data network. The MME is mainly responsible for mobility management and session management of a control plane, for example, user authentication, user switching, mobility management of a terminal in an idle mode, user context management, and bearer management.

The user plane network element 140 is responsible for processing and forwarding of a packet. The user plane element 140 may be a physical or virtual forwarding device such as a user plane function of a packet data network gateway (P-GW), a user plane function of a serving gateway (S-GW), a router, or a switch.

The data network 150 provides a data transmission service to a user, and may be a packet data network (PDN), for example, the Internet or an internet protocol multi-media service (IP IMS).

The terminal device 110 or the access network device 120 may be a sending apparatus for wireless communication and/or a receiving apparatus for wireless communication. When sending data, the sending apparatus for wireless communication may encode data for transmission. Specifically, the sending apparatus for wireless communication may obtain (for example, generating, receiving from another communications apparatus, or storing into a memory) a specific quantity of data bits that need to be sent to the receiving apparatus for wireless communication through a channel. The data bit may be included in a transport block (or a plurality of transport blocks) of the data, and the transport block may be segmented to generate a plurality of code blocks.

In addition, the communications system 100 may be a PLMN, a Device to Device (D2D) network, a Machine to Machine (M2M) network, or another network. FIG. 1 is merely a simplified schematic diagram used as an example, and the network may further include another network device, which is not shown in FIG. 1.

The wireless communication method provided in this embodiment of this application may be applied to a terminal device (for example, the drone), and the terminal device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, for example, a Linux operating system, a UNIX operating system, an Android operating system, an iOS operating system, or a Windows operating system. The application layer includes applications such as a browser, a contact list, a word processing software, and instant messaging software.

The wireless communication method provided in this embodiment of this application may be applied to a network device. The network device may be an access network device, or may be a data network.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to various media that can store, contain, and/or carry an instruction and/or data.

Figure 4:
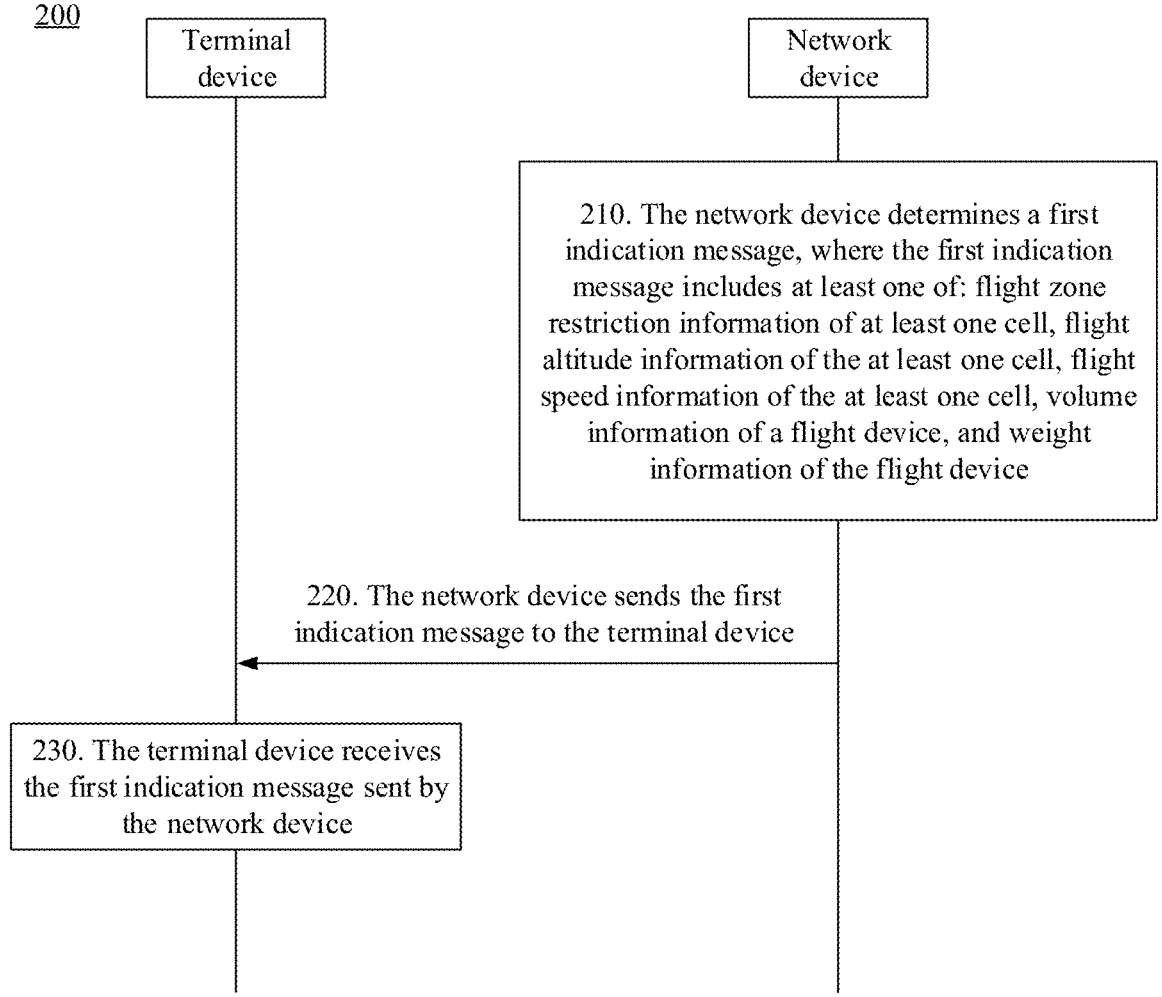
FIG. 4 is a schematic flowchart of a wireless communication method according to an embodiment of this application.

FIG. 4 is a schematic flowchart of a wireless communication method 200 according to an embodiment of this application. In the method 200, a terminal device may be a device in a drone, for example, a communications device in the drone, or a control device in the drone. As shown in FIG. 4, the method 200 includes the following content.

210. A network device determines a first indication message, where the first indication message includes at least one of: flight zone restriction information of at least one cell, flight altitude information of the at least one cell, flight speed information of the at least one cell, volume information of a flight device, and weight information of the flight device, and/or information about a flight transmission characteristic supported by the at least one cell.

It should be understood that the flight device may be a device having a flight capability, for example, the drone.

Optionally, the at least one cell may belong to at least one network device that includes the network device.

Optionally, the flight zone restriction information may be flight management and control information of the at least one cell.

Optionally, an entire flight zone may be divided, and different flight restriction information is assigned to different types of zones. For example, the entire flight zone may be divided into a type-A zone, a type-B zone, and a type-C zone. The type-A zone may be a flight-forbidden zone, the type-B zone may be a zone in which flight is allowed only after application is made, and the type-C zone may be a free flight zone in which an application is not required.

Optionally, the flight altitude information may be a maximum flight altitude.

Optionally, the flight speed information may be a maximum flight speed.

Optionally, the volume information of the flight device may be a maximum volume of the flight device, or may be a restriction to some flight devices having a special function, for example, a restriction to some attacking flight devices.

Optionally, the weight information of the flight device may be a maximum weight of the flight device.

Optionally, the first indication message may be capability support information, for the flight device, of the at least one cell, or flight indication information, for the flight device, of the at least one cell.

Optionally, the first indication message may include the information about the flight transmission characteristic supported by the at least one cell, for example, a characteristic such as supporting reporting of a location and a flight route of the flight device (for example, the drone), supporting multi-beam coverage of the flight route, or supporting high-altitude coverage.

Optionally, the first indication message may also include information about a flight transmission characteristic that is not supported by the at least one cell. For example, the flight device (for example, the drone) communicates with the network device (for example, a base station) in a same way as an ordinary terminal device (for example, a mobile phone).

Optionally, the first indication message may further include information indicating that the at least one cell supports air coverage. For example, a cell may support air coverage. In this case, a maximum coverage altitude may be 150 meters.

Optionally, the first indication message may further include information indicating that a current cell does not support air coverage. For example, the current cell does not support air coverage. In this case, a maximum coverage altitude may be 50 meters.

Optionally, the first indication message may further indicate at least one of: flight restriction information, information about a flight transmission characteristic, or air coverage information of one or more neighboring cells.

220. The network device sends the first indication message to the terminal device.

Optionally, the first indication message may be sent to the terminal device by using a broadcast message or a dedicated message.

It should be understood that when the network device sends the first indication message to the terminal device by using the dedicated message, the terminal device has accessed the network device.

230. The terminal device receives the first indication message sent by the network device.

Optionally, the terminal device obtains the first indication message by receiving the broadcast message, or may obtain the first indication message by receiving the dedicated message.

Optionally, when the terminal device meets a restriction included in the first indication message, the terminal device preferentially accesses the network device. Specifically, the terminal device preferentially accesses a cell belonging to the network device. Optionally, if the terminal device does not meet a flight restriction information of each of the at least one cell, the terminal device may not access any of the at least one cell.

Optionally, after receiving the first indication message, the terminal device determines whether the terminal device meets a flight restriction information of the current cell (a cell in the at least one cell). If a flight altitude of the terminal device exceeds a flight restriction requirement of the current cell is exceeded, the network device can learn of the flight altitude of the terminal device, and then the network device (for example, the base station) may stop data communication with the terminal device, and send alarm information to the terminal device.

Optionally, after receiving the first indication message, the terminal device determines whether the terminal device has the flight transmission characteristic supported by the at least one cell. The information about the transmission characteristic may help the terminal device select a cell for camping. For example, for a terminal device in an idle mode, it is detected that signal quality of a plurality of cells meets a cell selection condition. A cell 1 belongs to the type-C zone (in which application for flight is not required), and supports a transmission characteristic (supporting high-altitude coverage by using a beam) of the drone, and a cell 2 belongs to the type-A zone (in which flight is forbidden). Therefore, the terminal device preferentially chooses to camp on the cell 1 and flies in a range of the cell 1.

Optionally, the first indication message specific for the current cell may alternatively be added to a handover command and sent to the terminal device, so that the terminal can quickly adapt to a flight requirement of a new cell. For example, if the network device (for example, the base station) instructs the terminal device to be handed over to the cell 2, and the cell 2 belongs to the type-A zone in which flight is forbidden, the terminal device needs to reduce the flight altitude (for example, by 5 meters), or fly to a cell other than the cell 2. If the base station instructs the terminal device to be handed over to the cell 1, and the cell 1 is a zone in which flight can be performed only after application is made, the terminal device should first apply for flight, and then access the cell 1 after the application is approved.

Optionally, after accessing the cell, the terminal device may obtain the first indication message by using the dedicated message, to determine whether a current flight state meets a flight restriction. If the current flight state does not meet the flight restriction, the terminal device needs to adjust the flight altitude or leave the cell.

Optionally, after accessing the network device, the terminal device reports flight route information to the network device. The flight route information includes at least one of: three-dimensional location information of the terminal device, a three-dimensional flight speed of the terminal device, a three-dimensional flight direction of the terminal device, and information about an intermediate node location.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

For example, the start location of the terminal device is A, and the end location of the terminal device is B. In this case, the intermediate node location may be a location that is on a flight route of the terminal device and that is a first distance (for example, 10 m or 20 m) away from the start location A.

Optionally, when reaching the intermediate node location, the terminal device determines a next intermediate node location.

Optionally, the terminal device may report the flight route information in any one of the following manners.

Manner 1: The terminal device adds the flight route information to a measurement report. For example, a measurement report configuration includes a reporting indication of the flight route information. Optionally, because the three-dimensional location information of the terminal device needs to be frequently reported, a trigger factor for periodic reporting, for example, ReportLocationInfo, may be independently added for the three-dimensional location information, and content such as a location information reporting period, a quantity of reporting times, and a structure of the reported information may be separately specified, and is no longer configured together with signal quality reporting. In addition, the three-dimensional location information does not need to be reported after the signal quality meets a trigger condition, and may be independently reported. Optionally, the flight route information reporting may alternatively be independently configured and performed.

Manner 2: The terminal device may alternatively report the flight route information by using a dedicated radio resource control (RRC) message. Because the RRC message may include much configuration information, the flight route information may be periodically reported by using the RRC message.

Manner 3: The terminal device may alternatively report the flight route information by using a media access control control element (MAC CE), and MAC is a physical medium for controlling and connecting a physical layer. For example, because of a message restriction of the MAC CE (for example, the MAC CE can include only one indication for requesting reporting), the flight route information can be reported only once.

Manner 4: The terminal device may alternatively report the flight route information by using a channel quality information (CQI). For example, the terminal device reports the flight route information once by using a CQI message. Specifically, the terminal device may report, on a resource indicated by a downlink control information (DCI), the flight route information by reporting a message such as the CQI.

Optionally, the network device receives the flight route information reported by the terminal device.

Therefore, in this embodiment of this application, the terminal device may report the flight route information to the network device in a plurality of manners, to ensure reliability of reporting the flight route information.

Figure 5:
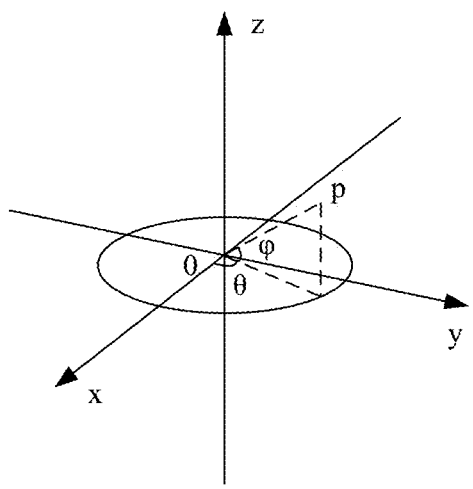
FIG. 5 is a schematic diagram of information about three-dimensional angles using a current location as a center by a terminal device.

Optionally, the terminal device may periodically report the flight route information. Optionally, the terminal device may indicate, in a reported content configuration, that information about the three-dimensional flight direction is included, that is, information about three-dimensional angles that use a current location as a center. Specifically, as shown in FIG. 5, an azimuth angle and an elevation angle (the elevation angle elevation angle PHI ($\varphi$) and the azimuth angle azimuth angle THETA ($\theta$)) is included. Alternatively, the terminal device may be instructed to report location information of an intermediate path node as a reference of the information about the flight direction. For example, the terminal device reports location information of a point P in the figure, indicating that a next node on the flight route is the point P. This helps the base station determine the flight route.

Optionally, after receiving the flight route information reported by the terminal device, the network device may determine, based on the flight route information, at least one resource for communicating with the terminal device.

Optionally, the network device transmits data to the terminal device by using the at least one resource.

Optionally, after the reporting, by the terminal device, flight route information, the method further includes:

receiving, by the terminal device by using at least one resource, the data transmitted by the network device, where data transmitted on all of the at least one resource is the same.

Optionally, the network device transmits the data by using a beam. In this case, there is at least one beam that is in a one-to-one correspondence with the at least one resource, and the beam is used to send the data at a corresponding resource location.

Figure 6:
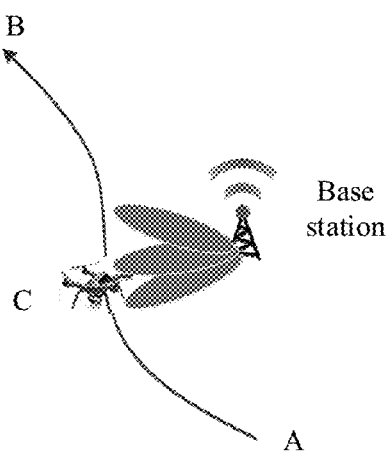
FIG. 6 is a schematic diagram of beam coverage during flight of a terminal device.

Specifically, after the network device (for example, the base station) obtains the current location of the terminal device, the base station may determine a beam used to communicate with the terminal device. After further obtaining the flight direction of the terminal device, the base station may use more beams to cover the flight route. Optionally, the base station may further obtain the flight speed of the terminal device, determine a maximum flight range of the terminal device based on an entire beam selection time, and determine, based on the maximum flight range, a quantity of beams required to cover the flight route. As shown in FIG. 6, the terminal device flies from a location A to a location B, and the flight route is shown by a curve between A and B. When the terminal device flies to an intermediate node location between A and B, the base station may cover the terminal device by using three beams, thereby ensuring that the terminal device correctly receives, when moving along the route, a downlink signal sent by the base station.

Optionally, the network device sends a second indication message to the terminal device. The second indication message includes configuration information of a first resource for transmitting the data, and the information indicates a specific configuration of the transmission resource, for example, resource block (RB) location information, a modulation and demodulation scheme (MCS), or a frequency hopping indicator. Optionally, the terminal device receives the second indication message sent by the network device, and receives, on the first resource and another preconfigured resource (for example, resources at two adjacent locations before and after the first resource) according to the second indication message, the data transmitted by the network device.

Optionally, the network device sends a third indication message to the terminal device. The third indication message includes resource configuration information of the at least one resource for transmitting the data, and optionally, may further indicate a total resource quantity. Optionally, the terminal device receives the third indication message sent by the network device, and receives, on the at least one resource according to the third indication message, the data transmitted by the network device.

Optionally, the second indication message and/or the third indication message may be the DCI, and the second indication message and/or the third indication message may alternatively be a message loaded into the DCI.

Specifically, in a scenario in which a plurality of beams are used to send data to the terminal device, the data sent by using the plurality of beams is completely the same. In this case, downlink scheduling information (for example, the DCI) may be sent in a conventional downlink sending manner instead of by using a beam. For example, the downlink scheduling information is sent through a physical downlink control channel (PDCCH). Optionally, after receiving the corresponding DCI, the terminal device receives the data at a plurality of resource locations according to a preconfigured rule. For example, locations of RBs indicated in the DCI are RB 21 to RB 30. In the preconfigured rule, locations of RBs on two sides of the foregoing resource blocks are also allocated to the terminal device for use, that is, RB 11 to RB 20 and RB 31 to RB 40 are also allocated to the terminal device for use. A difference lies in that the three beams respectively use the three frequency domain resources. Optionally, indication may be performed in an explicit mode, that is, a quantity of beams and a configuration message of a corresponding resource are indicated in the DCI, or only a configuration message of a corresponding resource is indicated. When receiving downlink data, the terminal device may directly attempt to receive the data at a plurality of corresponding resource locations. Optionally, the terminal device may perform combined receiving.

Therefore, in the wireless communication method in this embodiment of this application, the network device receives the flight route information reported by the terminal device, so that a resource for communicating with the terminal device can be determined based on the flight route information, thereby ensuring reliability of downlink data transmission.

Optionally, the terminal device reports flight capability information or UE category information to the network device. The flight capability information or the UE category information is used to:

indicate that the terminal device has a flight capability; and/or notify the network device that the terminal device is capable of reporting the flight route information, where the flight route information includes at least one of a three-dimensional location, the three-dimensional flight speed, and the three-dimensional flight direction of the terminal device. Optionally, the terminal device may report the flight capability information or the UE category information after accessing the network device, or may report the flight capability information or the UE category information when preparing to access the network device. Optionally, the terminal device reports the flight route information only after reporting the flight capability information.

Optionally, the network device receives the flight capability information or the UE category information reported by the terminal device.

Optionally, the terminal device may further report location information to the network device. Optionally, the network device receives the location information reported by the terminal device.

It should be understood that a reporting manner of the location information may be similar to that of the flight route information. For brevity, details are not described again.

It should be further understood that the network device may directly obtain the flight altitude information of the terminal device from the location information.

Optionally, after receiving the location information, the network device determines whether the flight altitude of the terminal device is greater than a first threshold, and sends a fourth indication message to the terminal device when the flight altitude of the terminal device is greater than the first threshold. The fourth indication message is used to indicate that flight of the terminal device violates a regulation, and/or that the flight altitude needs to be reduced or the flight needs to be stopped. Optionally, the terminal device receives the fourth indication message sent by the network device when the flight altitude of the terminal device is greater than the first threshold.

Optionally, the fourth indication message may be an alarm message.

Specifically, after the terminal device reports the location information, the network device (for example, the base station) may determine whether current flight of the terminal device exceeds an allowed range. For example, the maximum flight altitude is 80 meters, but the terminal device currently flies at an altitude of 120 meters; or a current cell is a flight-forbidden zone, but the drone flies at an altitude of 30 meters. None of these cases is allowed. In this case, the base station may send the alarm message to the terminal device, to notify the drone that the flight of the terminal device has violated a requirement of the regulation, and that the flight altitude needs to be reduced or the flight needs to be stopped. The alarm information may be continuously sent to the terminal device, and a data transmission service of the terminal device is simultaneously stopped. To be specific, if downlink data arrives at the terminal device, the base station does not send the downlink data; if the terminal device needs to send uplink data, the base station does not allocate a resource to the terminal device; and if a semi-static resource has been allocated to the terminal device, the base station may also cancel the resource.

Therefore, in the wireless communication method in this embodiment of this application, the network device receives the location information reported by the terminal device, so that the network device can obtain the location information of the terminal device during the flight in a timely manner, and send the indication message in a timely manner when the flight altitude of the terminal device is greater than the first threshold, thereby ensuring that the terminal device flies in an appropriate zone.

Optionally, the network device sends a configuration message to the terminal device. The configuration message is used to instruct the terminal device to report the flight route information and/or the location information.

Optionally, the terminal device receives the configuration message from the network device, and reports the flight route information and/or the location information based on the configuration message.

Optionally, the network device may send the configuration message in any one of the following manners:

Manner 1: The network device may send the configuration message by using an RRC message.

Manner 2: The network device may alternatively send the configuration message by using a MAC CE.

Manner 3: The network device may alternatively send the configuration message by using a CQI message.

Figure 7:
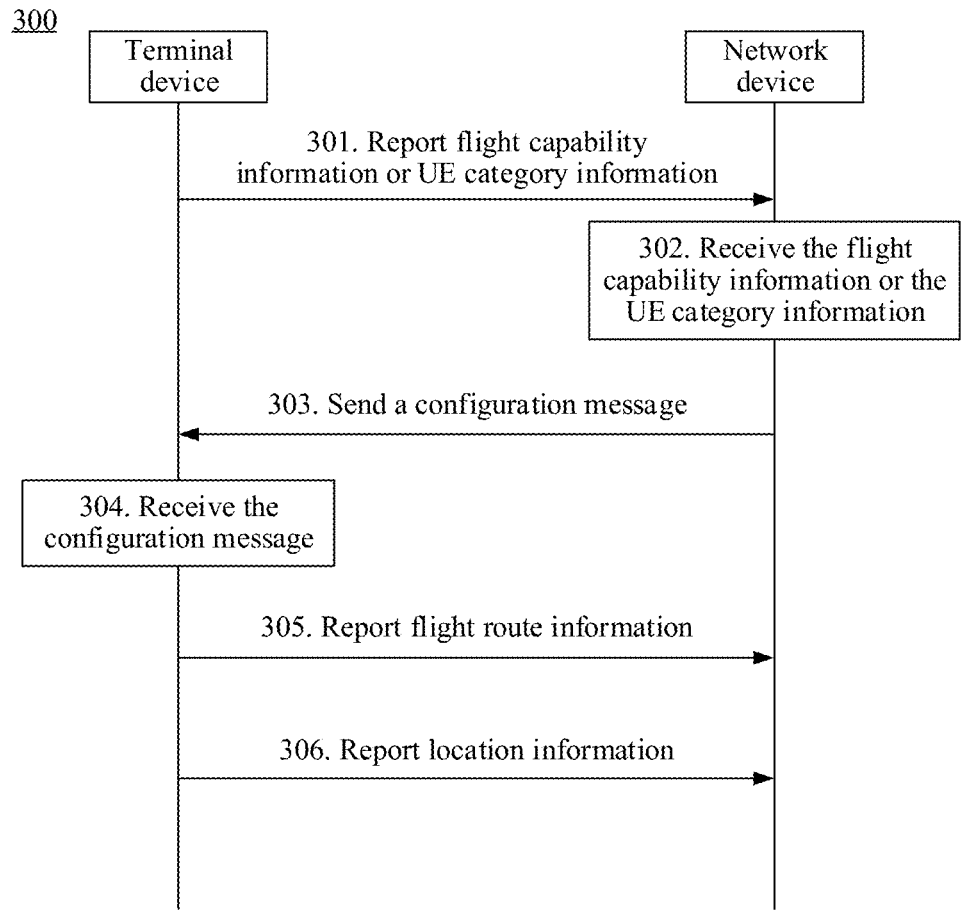
FIG. 7 is a schematic flowchart of a wireless communication method according to another embodiment of this application.

Optionally, in an embodiment, FIG. 7 is a schematic flowchart of a wireless communication method 300 according to an embodiment of this application. The method 300 includes the following content.

301. A terminal device reports flight capability information or UE category information to a network device, where the flight capability information or the UE category information is used to indicate that the terminal device has a flight capability, and/or notify the network device that the terminal device is capable of reporting flight route information and/or location information, the flight route information includes at least one of: a three-dimensional location of the terminal device, a three-dimensional flight speed of the terminal device, a three-dimensional flight direction of the terminal device, and information about an intermediate node location.

Optionally, the terminal device may report the flight capability information or the UE category information after accessing the network device, or may report the flight capability information or the UE category information when preparing to access the network device. Optionally, the terminal device reports the flight route information and/or the location information only after reporting the flight capability information.

302. The network device receives the flight capability information or the UE category information reported by the terminal device.

303. The network device sends a configuration message to the terminal device, where the configuration message is used to instruct the terminal device to report the flight route information and/or the location information.

Optionally, the network device may send the configuration message in any one of the following manners:

Manner 1: The network device may send the configuration message by using an RRC message.

Manner 2: The network device may alternatively send the configuration message by using a MAC CE.

Manner 3: The network device may alternatively send the configuration message by using a CQI message.

304. The terminal device receives the configuration message sent by the network device.

Optionally, the terminal device may report the flight route information and/or the location information according to the configuration message.

Optionally, the flight route information includes at least one of: three-dimensional location information of the terminal device, the three-dimensional flight speed of the terminal device, the three-dimensional flight direction of the terminal device, or the information about the intermediate node location.

Optionally, the information about the intermediate node location may be information about a location between a start location and an end location of the terminal device, and the information about the intermediate node location may include longitude information, latitude information, and altitude information. Optionally, the information about the intermediate node location may further include speed information of the terminal device at the location.

For example, the start location of the terminal device is A, and the end location of the terminal device is B. In this case, the intermediate node location may be a location that is on a flight route of the terminal device and that is a first distance (for example, 10 m or 20 m) away from the start location A.

Optionally, when reaching the intermediate node location, the terminal device determines a next intermediate node location.

Optionally, the network device may directly obtain information, such as a flight zone and a flight altitude, of the terminal device from the location information.

305. The terminal device reports the flight route information to the network device.

Optionally, the terminal device may report the flight route information in any one of the following manners:

Manner 1: The terminal device adds the flight route information to a measurement report. For example, a measurement report configuration includes a reporting indication of the flight route information. Optionally, because the three-dimensional location information of the terminal device needs to be frequently reported, a trigger factor for periodic reporting, for example, ReportLocationInfo, may be independently added for the three-dimensional location information, and content such as a location information reporting period, a quantity of reporting times, and a structure of the reported information may be separately specified, and is no longer configured together with signal quality reporting. In addition, the three-dimensional location information does not need to be reported after the signal quality meets a trigger condition, and may be independently reported. Optionally, the flight route information reporting may alternatively be independently configured and performed.

Manner 2: The terminal device may alternatively report the flight route information by using a dedicated RRC message. For example, because the RRC message may include much configuration information, the flight route information may be periodically reported by using the RRC message.

Manner 3: The terminal device may alternatively report the flight route information by using the MAC CE. For example, because of a message restriction of the MAC CE (for example, the MAC CE can include only one indication for requesting reporting), the flight route information can be reported only once.

Manner 4: The terminal device may alternatively report the flight route information by using a CQI message. For example, the terminal device reports the flight route information once by using the CQI message. Specifically, the terminal device may report, on a resource indicated by DCI, the flight route information by reporting a message such as CQI.

Optionally, the network device receives the flight route information reported by the terminal device.

Therefore, in this embodiment of this application, the terminal device may report the flight route information to the network device in a plurality of manners, to ensure reliability of reporting the flight route information.

Optionally, the terminal device may periodically report the flight route information. Optionally, the terminal device may indicate, in a reported content configuration, that information about the three-dimensional flight direction is included, that is, information about three-dimensional angles that use a current location as a center. Alternatively, the terminal device may be instructed to report location information of an intermediate path node as a reference of the information about the flight direction, to help a base station determine the flight route.

Optionally, after receiving the flight route information reported by the terminal device, the network device may determine, based on the flight route information, at least one resource for communicating with the terminal device.

Optionally, the network device transmits data to the terminal device by using the at least one resource.

Optionally, after the terminal device reports flight route information, the method further includes:

receiving, by the terminal device by using at least one resource, the data transmitted by the network device, where data transmitted on all of the at least one resource is the same.

Optionally, the network device transmits the data by using a beam. In this case, there is at least one beam that is in a one-to-one correspondence with the at least one resource, and the beam is used to send the data at a corresponding resource location.

Specifically, after the network device (for example, the base station) obtains the current location of the terminal device, the base station may determine a beam used to communicate with the terminal device. After further obtaining the flight direction of the terminal device, the base station may use more beams to cover the flight route. Optionally, the base station may further obtain the flight speed of the terminal device, determine a maximum flight range of the terminal device based on an entire beam selection time, and determine, based on the maximum flight range, a quantity of beams required to cover the flight route.

Optionally, the network device sends a first indication message to the terminal device. The first indication message includes configuration information of a first resource for transmitting the data, and the information indicates a specific configuration of the transmission resource, for example, RB location information, an MCS, or a frequency hopping indicator. Optionally, the terminal device receives the first indication message sent by the network device, and receives, on the first resource and another preconfigured resource (for example, resources at two adjacent locations before and after the first resource) according to the first indication message, the data transmitted by the network device.

Optionally, the network device sends a second indication message to the terminal device. The second indication message includes resource configuration information of the at least one resource for transmitting the data, and optionally, may further indicate a total resource quantity. Optionally, the terminal device receives the second indication message sent by the network device, and receives, on the at least one resource according to the second indication message, the data transmitted by the network device.

Optionally, the first indication message and/or the second indication message may be the DCI, and the first indication message and/or the second indication message may alternatively be a message loaded in the DCI.

Specifically, in a scenario in which a plurality of beams are used to send data to the terminal device, the data sent by using the plurality of beams is completely the same. In this case, downlink scheduling information (for example, the DCI) may be sent in a conventional downlink sending manner instead of by using a beam. For example, the downlink scheduling information is sent through a PDCCH. Optionally, after receiving the corresponding DCI, the terminal device receives the data at a plurality of resource locations according to a preconfigured rule. For example, locations of RBs indicated in the DCI are RB 21 to RB 30. In the preconfigured rule, locations of RBs on two sides of the foregoing resource blocks are also allocated to the terminal device for use, that is, RB 11 to RB 20 and RB 31 to RB 40 are also allocated to the terminal device for use. A difference lies in that the three beams respectively use the three frequency domain resources. Optionally, indication may be performed in an explicit mode, that is, a quantity of beams and a configuration message of a corresponding resource are indicated in the DCI, or only a configuration message of a corresponding resource is indicated. When receiving downlink data, the terminal device may directly attempt to receive the data at a plurality of corresponding resource locations. Optionally, the terminal device may perform combined receiving.

Therefore, in the wireless communication method in this embodiment of this application, the network device receives the flight route information reported by the terminal device, so that a resource for communicating with the terminal device can be determined based on the flight route information, thereby ensuring reliability of downlink data transmission.

306. The terminal device reports the location information to the network device.

It should be understood that a reporting manner of the location information may be similar to that of the flight route information. For brevity, details are not described again.

Optionally, after receiving the location information, the network device determines whether the flight altitude of the terminal device is greater than a first threshold, and sends a third indication message to the terminal device when the flight altitude of the terminal device is greater than the first threshold. The third indication message is used to indicate that flight of the terminal device violates a regulation, and/or that the flight altitude needs to be reduced or the flight needs to be stopped. Optionally, the terminal device receives the third indication message sent by the network device when the flight altitude of the terminal device is greater than the first threshold.

Optionally, the third indication message may be an alarm message.

Optionally, step 305 and step 306 may be simultaneously performed. To be specific, the terminal device may simultaneously report the flight route information and the location information.

Therefore, in the wireless communication method in this embodiment of this application, the network device receives the location information reported by the terminal device, so that the location information of the terminal device during flight can be obtained in a timely manner, and the indication message is sent in a timely manner when the flight altitude of the terminal device is greater than the first threshold, thereby ensuring that the terminal device flies in an appropriate zone.

Figure 8:
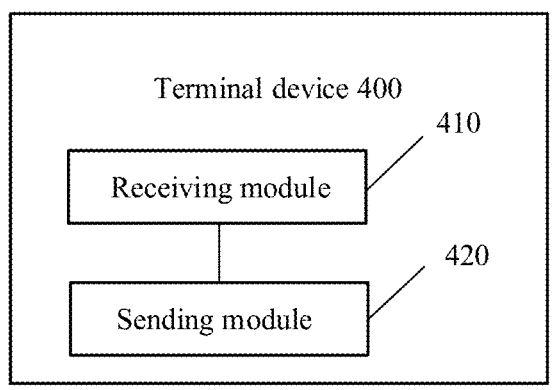
FIG. 8 is a schematic block diagram of a terminal device according to an embodiment of this application.

FIG. 8 is a schematic block diagram of a terminal device 400 according to an embodiment of this application. As shown in FIG. 8, the device 400 includes:

a receiving module 410, configured to receive a first indication message sent by a network device, where the first indication message includes at least one of: flight zone restriction information of at least one cell, flight altitude information of the at least one cell, flight speed information of the at least one cell, volume information of a flight device, and weight information of the flight device, and/or the first indication message includes information about a flight transmission characteristic supported by the at least one cell.

Optionally, the terminal device 400 further includes:

a sending module 420, configured to report flight route information to the network device, where the flight route information includes at least one of: a three-dimensional flight speed of the terminal device, a three-dimensional flight direction of the terminal device, and information about an intermediate node location.

Optionally, after the sending module 420 reports the flight route information, the receiving module 410 is further configured to receive, by using at least one resource, data transmitted by the network device, where data transmitted on all of the at least one resource is the same.

Optionally, the receiving module 410 is further configured to receive a second indication message sent by the network device. The second indication message includes configuration information of a first resource for transmitting the data.

The receiving module 410 is further configured to receive, on the first resource and another preconfigured resource according to the second indication message, the data transmitted by the network device.

Optionally, the receiving module 410 is further configured to receive a third indication message sent by the network device. The third indication message includes resource configuration information of the at least one resource for transmitting the data.

The receiving module 410 is further configured to receive, on the at least one resource according to the third indication message, the data transmitted by the network device.

Optionally, the receiving module 410 is further configured to receive a configuration message from the network device. The configuration message is used to instruct the terminal device to report the flight route information.

The sending module 420 is further configured to report the flight route information based on the configuration message.

Optionally, the sending module 420 is further configured to add the flight route information to a measurement report.

Optionally, the sending module 420 is further configured to report flight capability information or terminal device category information to the network device. The flight capability information is used to indicate that the terminal device has a flight capability or indicate the terminal device category information, and/or notify the network device that the terminal device is capable of reporting the flight route information, and the flight route information includes at least one of: the three-dimensional flight speed of the terminal device, the three-dimensional flight direction of the terminal device, and the information about the intermediate node location.

Optionally, the sending module 420 is further configured to report location information to the network device.

The receiving module 410 is further configured to receive a fourth indication message sent by the network device when a flight altitude of the terminal device is greater than a first threshold. The fourth indication message is used to indicate that flight of the terminal device violates a regulation, and/or that the flight altitude needs to be reduced or the flight needs to be stopped.

Optionally, the terminal device 400 further includes:

a processing module 430, configured to: when the terminal device meets a flight restriction of a first cell, and/or has a flight transmission characteristic supported by the first cell, preferentially access the first cell, where the first cell belongs to the at least one cell.

It should be understood that the foregoing and other operations and/or functions of the units in the terminal device 400 according to this embodiment of this application are used to implement corresponding procedures of the terminal device in the method 200 in FIG. 4. For brevity, details are not described again.

Figure 9:
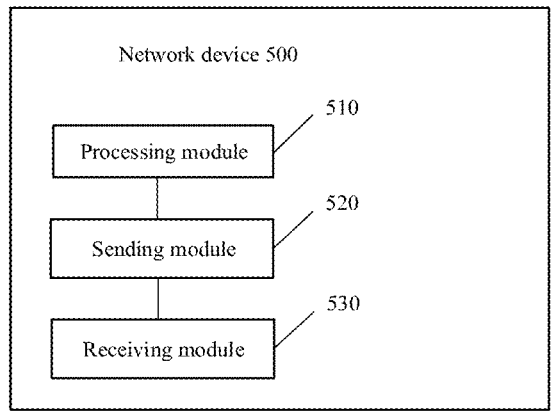
FIG. 9 is a schematic block diagram of a network device according to an embodiment of this application.

FIG. 9 is a schematic block diagram of a network device 500 according to an embodiment of this application. As shown in FIG. 9, the device 500 includes:

a processing module 510, configured to determine a first indication message, where the first indication message includes at least one of: flight zone restriction information of at least one cell, flight altitude information of the at least one cell, flight speed information of the at least one cell, volume information of a flight device, and weight information of the flight device, and/or information about a flight transmission characteristic supported by the at least one cell; and a sending module 520, configured to send the first indication message to a terminal device.

Optionally, the network device 500 further includes:

a receiving module 530, configured to receive flight route information reported by the terminal device, where the flight route information includes at least one of: a three-dimensional flight speed of the terminal device, a three-dimensional flight direction of the terminal device, and information about an intermediate node location.

The processing module 510 is further configured to determine, based on the flight route information, at least one resource for communicating with the terminal device.

Optionally, after the processing module 510 determines the at least one resource for communicating with the terminal device, the sending module 520 is further configured to transmit data to the terminal device by using the at least one resource. Data transmitted on all of the at least one resource is the same.

Optionally, before the sending module 520 transmits the data to the terminal device by using the at least one resource, the sending module 520 is further configured to send a second indication message to the terminal device, where the second indication message includes configuration information of a first resource for transmitting the data, so that the terminal device receives, on the first resource and another preconfigured resource, the data transmitted by the network device; or the sending module 520 is further configured to send a third indication message to the terminal device, where the third indication message includes resource configuration information of the at least one resource for transmitting the data, so that the terminal device receives, on the at least one resource, the data transmitted by the network device.

Optionally, before the receiving module 530 receives the flight route information reported by the terminal device, the sending module 520 is further configured to send a configuration message to the terminal device. The configuration message is used to instruct the terminal device to report the flight route information.

Optionally, the receiving module 530 is further configured to receive a measurement report of the terminal device. The measurement report carries the flight route information.

Optionally, the receiving module 530 is further configured to receive a flight capability information or terminal device category information from the terminal device. The flight capability information or the terminal device category information is used to indicate that the terminal device has a flight capability, and/or notify the network device that the terminal device is capable of reporting the flight route information.

Optionally, the receiving module 530 is further configured to receive location information reported by the terminal device.

The sending module 520 is further configured to: when a flight altitude of the terminal device is greater than a first threshold, send a fourth indication message to the terminal device. The fourth indication message is used to indicate that flight of the terminal device violates a regulation, and/or the flight altitude needs to be reduced or the flight needs to be stopped.

It should be understood that the foregoing and other operations and/or functions of the units in the network device 500 according to this embodiment of this application are used to implement corresponding procedures of the network device in the method 200 in FIG. 4. For brevity, details are not described again.

Figure 10:
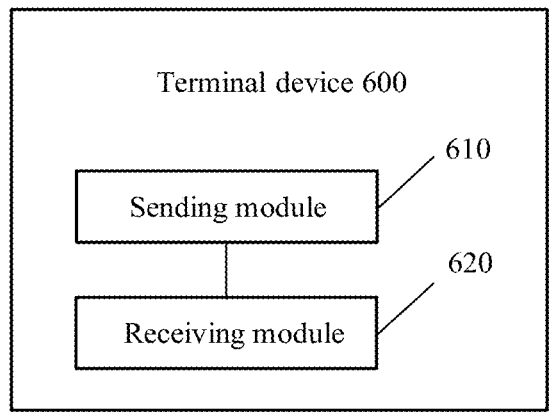
FIG. 10 is a schematic block diagram of another terminal device according to an embodiment of this application.

FIG. 10 is a schematic block diagram of a terminal device 600 according to an embodiment of this application. As shown in FIG. 10, the device 600 includes:

a sending module 610, configured to report flight route information to a network device, where the flight route information includes at least one of: a three-dimensional flight speed of the terminal device, a three-dimensional flight direction of the terminal device, and information about an intermediate node location, so that the network device determines, based on the flight route information, at least one resource for communicating with the terminal device.

Optionally, after the sending module 610 reports the flight route information, the terminal device 600 further includes:

a receiving module 620, configured to receive, by using the at least one resource, data transmitted by the network device, where data transmitted on all of the at least one resource is the same.

Optionally, the receiving module 620 is further configured to receive a first indication message sent by the network device. The first indication message includes configuration information of a first resource for transmitting the data.

The receiving module 620 is further configured to receive, on the first resource and another preconfigured resource according to the first indication message, the data transmitted by the network device.

Optionally, the receiving module 620 is further configured to receive a second indication message sent by the network device. The second indication message includes a quantity of the at least one resource for transmitting the data and a resource location of the at least one resource for transmitting the data.

The receiving module 620 is further configured to receive, on the at least one resource according to the second indication message, the data transmitted by the network device.

Optionally, the receiving module 620 is further configured to receive a configuration message from the network device. The configuration message is used to instruct the terminal device to report the flight route information.

The sending module 610 is further configured to report the flight route information based on the configuration message.

Optionally, the sending module 610 is further configured to add the flight route information to a measurement report.

Optionally, the sending module 610 is further configured to report flight capability information or UE category information to the network device. The flight capability information or the UE category information is used to indicate that the terminal device has a flight capability, and/or notify the network device that the terminal device is capable of reporting the flight route information, and the flight route information includes at least one of: the three-dimensional flight speed of the terminal device, the three-dimensional flight direction of the terminal device, and the information about the intermediate node location.

Optionally, the sending module 610 is further configured to report location information to the network device.

The receiving module 620 is further configured to receive a third indication message sent by the network device when a flight altitude of the terminal device is greater than a first threshold. The third indication message is used to indicate that flight of the terminal device violates a regulation, and/or that the flight altitude needs to be reduced or the flight needs to be stopped.

It should be understood that the foregoing and other operations and/or functions of the units in the terminal device 600 according to this embodiment of this application are used to implement corresponding procedures of the terminal device in the method 300 in FIG. 7. For brevity, details are not described again.

Figure 11:
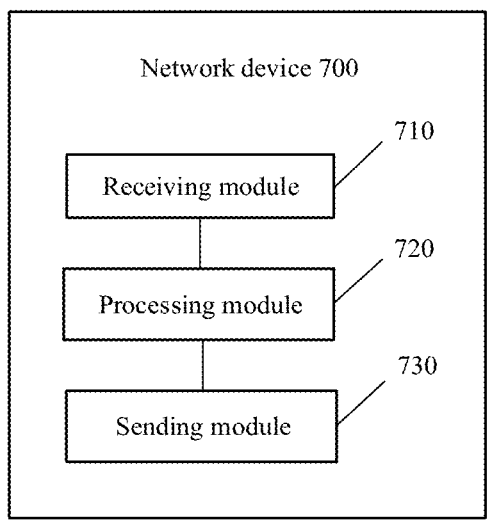
FIG. 11 is a schematic block diagram of another network device according to an embodiment of this application.

FIG. 11 is a schematic block diagram of a network device 700 according to an embodiment of this application. As shown in FIG. 11, the device 700 includes:

a receiving module 710, configured to receive flight route information reported by a terminal device, where the flight route information includes at least one of: a three-dimensional flight speed of the terminal device, a three-dimensional flight direction of the terminal device, and information about an intermediate node location; and a processing module 720, configured to determine, based on the flight route information, at least one resource for communicating with the terminal device.

Optionally, after the processing module 720 determines the at least one resource for communicating with the terminal device, the network device 700 further includes:

a sending module 730, configured to transmit data to the terminal device by using the at least one resource, where data transmitted on all of the at least one resource is the same.

Optionally, before the sending module 730 transmits the data to the terminal device by using the at least one resource, the sending module 730 is further configured to send a first indication message to the terminal device, where the first indication message includes configuration information of a first resource for transmitting the data, so that the terminal device receives, on the first resource and another preconfigured resource, the data transmitted by the network device; or the sending module 730 is further configured to send a second indication message to the terminal device, where the second indication message includes resource configuration information of the at least one resource for transmitting the data, so that the terminal device receives, on the at least one resource, the data transmitted by the network device.

Optionally, before the receiving module 710 receives the flight route information reported by the terminal device, the sending module 730 is further configured to send a configuration message to the terminal device. The configuration message is used to instruct the terminal device to report the flight route information.

Optionally, the receiving module 710 is further configured to receive a measurement report of the terminal device. The measurement report carries the flight route information.

Optionally, the receiving module 710 is further configured to receive a flight capability information or UE category information from the terminal device. The flight capability information or the UE category information is used to indicate that the terminal device has a flight capability, and/or notify the network device that the terminal device is capable of reporting the flight route information.

Optionally, the receiving module 710 is further configured to receive location information reported by the terminal device.

The sending module 730 is further configured to: when a flight altitude of the terminal device is greater than a first threshold, send a third indication message to the terminal device. The third indication message is used to indicate that flight of the terminal device violates a regulation, and/or the flight altitude needs to be reduced or the flight needs to be stopped.

It should be understood that the foregoing and other operations and/or functions of the units in the network device 700 according to this embodiment of this application are used to implement corresponding procedures of the network device in the method 300 in FIG. 7. For brevity, details are not described again.

Figure 12:
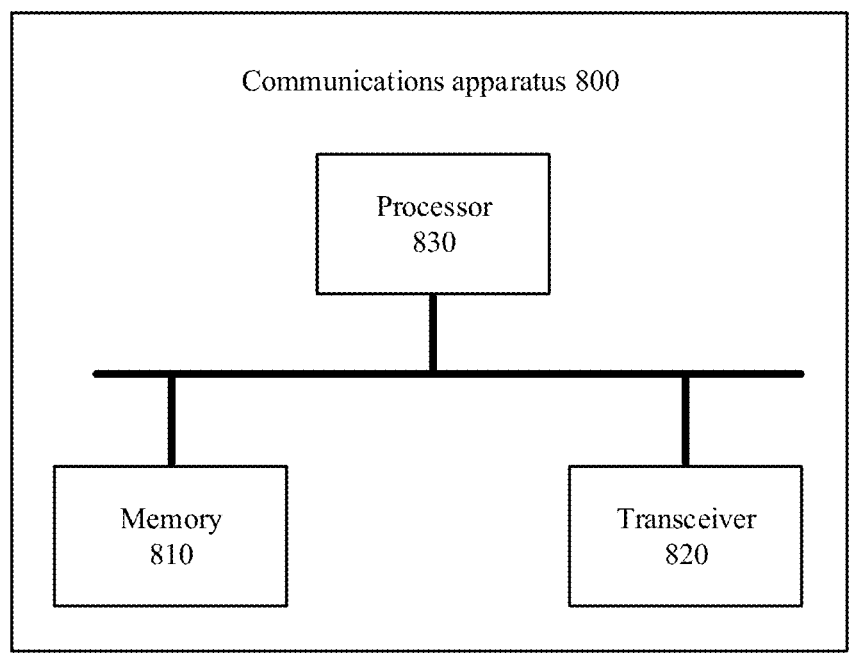
FIG. 12 is a schematic block diagram of a communications device according to an embodiment of this application.

FIG. 12 is a schematic block diagram of a communications apparatus 800 according to an embodiment of this application. The communications apparatus 800 includes:

a memory 810, configured to store a program, where the program includes code;

a transceiver 820, configured to communicate with another device; and a processor 830, configured to execute the code in the memory 810.

Optionally, when the code is executed, the processor 830 may implement operations performed by the terminal device in the method 200 in FIG. 4 or the method 300 in FIG. 7. For brevity, details are not described again. In this case, the communications apparatus 800 may be a terminal device. The transceiver 820 is configured to receive and send a specific signal when driven by the processor 830.

Optionally, when the code is executed, the processor 830 may further implement operations performed by the network device in the method 200 in FIG. 4 or the method 300 in FIG. 7. For brevity, details are not described again. In this case, the communications apparatus 800 may be a network device.

It should be understood that, the processor 830 in this embodiment of this application may be a CPU, or the processor 830 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 810 may include a read-only memory and a random access memory, and provide an instruction and data to the processor 830. A part of the memory 810 may further include a non-volatile random access memory. For example, the memory 810 may further store information about a device type.

The transceiver 820 may be configured to implement signal sending and receiving functions such as frequency modulation and demodulation functions or up- and down-frequency conversion functions.

In an implementation process, at least one step in the foregoing methods may be completed by an integrated logic circuit of hardware in the processor 830, or the integrated logic circuit may complete the at least one step after being driven by an instruction in a form of software. Therefore, the communications apparatus 800 may be a chip or a chip set. The steps of the method disclosed in the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor 830 reads information in the memory and completes the steps in the foregoing methods in combination with hardware of the processor. To avoid repetition, details are not described again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   reporting, by a terminal device, flight capability information to a network device, wherein the flight capability information notifies that the terminal device is capable of reporting flight route information;
   receiving, by the terminal device, a first indication message from the network device, wherein the first indication message is a radio resource control (RRC) message that indicates the network device supports receiving a report of the flight route information from the terminal device;
   reporting, by the terminal device, the flight route information to the network device; and
   receiving, by the terminal device by using at least one resource and after reporting the flight route information to the network device, data from the network device, wherein the at least one resource includes a first resource and a second resource, and wherein the data is transmitted via the first resource by using a first beam and the data is transmitted via the second resource by using a second beam.

2. The method according to claim 1, wherein the flight route information further comprises at least one of:
   a three-dimensional flight speed of the terminal device, and a three-dimensional flight direction of the terminal device, and wherein at least one of the first beam or the second beam is determined based on a flight direction and/or a flight speed of the terminal device included in the flight route information.

3. The method according to claim 2, wherein data transmitted on each resource of the at least one resource is the same.

4. The method according to claim 3, wherein the receiving, by the terminal device by using the at least one resource, the data from the network device comprises:
   receiving, by the terminal device, a second indication message from the network device, wherein the second indication message comprises configuration information of the first resource and the second resource for transmitting the data; and
   receiving, by the terminal device on the first resource and the second resource according to the second indication message, the data from the network device.

5. The method according to claim 3, wherein the receiving, by the terminal device by using the at least one resource, the data from the network device comprises:
   receiving, by the terminal device, a third indication message from the network device, wherein the third indication message comprises resource configuration information of the at least one resource for transmitting the data; and
   receiving, by the terminal device on the at least one resource according to the third indication message, the data from the network device.

6. The method according to claim 1, wherein the reporting, by the terminal device, the flight route information to the network device comprises:
   receiving, by the terminal device, a configuration message from the network device, wherein the configuration message is used to instruct the terminal device to report the flight route information; and
   reporting, by the terminal device, the flight route information based on the configuration message.

7. A terminal device, comprising:
   a transceiver, configured to:
      report flight capability information to a network device, wherein the flight capability information notifies that the terminal device is capable of reporting flight route information;
      receive a first indication message from the network device, wherein the first indication message is a radio resource control (RRC) message that indicates the network device supports receiving a report of the flight route information from the terminal device;
      report, the flight route information to the network device, and
      receive, by using at least one resource and after reporting the flight route information to the network device, data from the network device, wherein the at least one resource includes a first resource and a second resource, and wherein the data is transmitted via the first resource by using a first beam and the data is transmitted via the second resource by using a second beam.

8. The terminal device according to claim 7, wherein the flight route information further comprises at least one of:
   a three-dimensional flight speed of the terminal device, and a three-dimensional flight direction of the terminal device, and wherein at least one of the first beam or the second beam is determined based on the three-dimensional flight direction and/or the three-dimensional flight speed of the terminal device included in the flight route information.

9. The terminal device according to claim 8, wherein the data transmitted on each resource of the at least one resource is the same.

10. The terminal device according to claim 9, wherein the transceiver is further configured to:
    receive a second indication message from the network device, wherein the second indication message comprises configuration information of the first resource and the second resource for transmitting the data; and
    receive, on the first resource and the second resource according to the second indication message, the data from the network device.

11. The terminal device according to claim 7, wherein the transceiver is further configured to:

receive a configuration message from the network device, wherein the configuration message is used to instruct the terminal device to report the flight route information; and report the flight route information based on the configuration message.

12. A network device, comprising:
a processor, configured to:
receive flight capability information from a terminal device, wherein the flight capability information notifies that the terminal device is capable of reporting flight route information; and
determine a first indication message, wherein the first indication message indicates the network device supports receiving a report of the flight route information from the terminal device; and
a transceiver, configured to:
send the first indication message to the terminal device by using a radio resource control (RRC) message;
receive flight route information from the terminal device; and
transmit, by using at least one resource and after receiving the flight route information from the terminal device, data to the terminal device, wherein the at least one resource includes a first resource and a second resource, and wherein the data is transmitted via the first resource by using a first beam and the data is transmitted via the second resource by using a second beam.

13. The network device according to claim 12, wherein the flight route information further comprises at least one of:
a three-dimensional flight speed of the terminal device, and a three-dimensional flight direction of the terminal device; and
wherein the processor is further configured to determine, based on the flight route information, at least one of the first beam or the second beam based on the three-dimensional flight direction and/or the three-dimensional flight speed of the terminal device included in the flight route information.

14. The network device according to claim 13, wherein the data transmitted on each resource of the at least one resource is the same.

15. The network device according to claim 14, wherein before the transceiver transmits, by using the at least one resource, the data to the terminal device, the transceiver is further configured to:
send a second indication message to the terminal device, wherein the second indication message comprises configuration information of the first resource and the second resource for transmitting the data, so that the terminal device receives, on the first resource or the second resource, the data from the network device; or
send a third indication message to the terminal device, wherein the third indication message comprises resource configuration information of the at least one resource for transmitting the data, so that the terminal device receives, on the at least one resource, the data from the network device.

16. The network device according to claim 13, wherein before the transceiver receives the flight route information from the terminal device, the transceiver is further configured to send a configuration message to the terminal device, wherein the configuration message is used to instruct the terminal device to report the flight route information.

17. The network device according to claim 13, wherein the transceiver is further configured to receive a measurement report of the terminal device, wherein the measurement report carries the flight route information.

18. A wireless communication method, comprising:
receiving flight capability information from a terminal device, wherein the flight capability information notifies that the terminal device is capable of reporting flight route information;
determining a first indication message, wherein the first indication message indicates the network device supports receiving a report of the flight route information from the terminal device;
sending the first indication message to the terminal device by using a radio resource control (RRC) message;
receiving flight route information from the terminal device, and
transmitting, by using at least one resource and after receiving the flight route information from the terminal device, data to the terminal device, wherein the at least one resource includes a first resource and a second resource, and wherein the data is transmitted via the first resource by using a first beam and the data is transmitted via the second resource by using a second beam.

19. The wireless communication method according to claim 18, wherein the flight route information further comprises at least one of a three-dimensional flight speed of the terminal device, or a three-dimensional flight direction of the terminal device; and the method further comprises determining, based on the flight route information,
at least one of the first beam or the second beam based on the three-dimensional flight direction and/or the three-dimensional flight speed of the terminal device included in the flight route information.

20. The method according to claim 18, wherein before the receiving, by the network device, the flight route information from the terminal device, the method further comprises:
sending, by the network device, a configuration message to the terminal device, wherein the configuration message instructs the terminal device to report the flight route information.

21. The method according to claim 18, wherein the receiving, by the network device, flight route information from the terminal device comprises:
receiving, by the network device, a measurement report of the terminal device, wherein the measurement report carries the flight route information.

22. The method according to claim 1, wherein the first indication message further comprises flight zone restriction information of at least one cell, flight altitude information of the at least one cell, flight speed information of the at least one cell, volume information of a terminal device, and weight information of the terminal device.

23. The terminal device according to claim 7, wherein the first indication message further comprises flight zone restriction information of at least one cell, flight altitude information of the at least one GO, flight speed information of the at least one cell, volume information of a terminal device, and weight information of the terminal device.

24. The network device according to claim 12, wherein the first indication message further comprises flight zone restriction information of at least one cell, flight altitude information of the at least one cell, flight speed information of the at least one cell, volume information of a terminal device, and weight information of the terminal device.

* * * * *

UNITED STATES PATENT AND TRADEMARK OFFICE
CERTIFICATE OF CORRECTION

PATENT NO. : 11,330,602 B2  
APPLICATION NO. : 16/674280  
DATED : May 10, 2022  
INVENTOR(S) : Tang et al.

Page 1 of 1

It is certified that error appears in the above-identified patent and that said Letters Patent is hereby corrected as shown below:

In the Claims

Claim 2: Column 29, Line 50: "route information further comprises at least one of;" should read -- route information further comprises at least one of: --.

Claim 7: Column 30, Line 36: "report, the flight route information to the network device," should read -- report, the flight route information to the network device; --.

Claim 23: Column 32, Line 56: "tion of the at least one GO, flight speed information of the" should read -- tion of the at least one cell, flight speed information of the --.

Signed and Sealed this  
Eleventh Day of October, 2022

Katherine Kelly Vidal  
*Director of the United States Patent and Trademark Office*